(12) United States Patent
Kong et al.

(10) Patent No.: US 10,333,610 B2
(45) Date of Patent: Jun. 25, 2019

(54) MCS INDEX DETERMINATION METHOD AND BASE STATION EQUIPMENT

(71) Applicant: DATANG MOBILE COMMUNICATIONS EQUIPMENT CO.,LTD, Beijing (CN)

(72) Inventors: Jian Kong, Beijing (CN); Ling Wang, Beijing (CN); Jinxi Su, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 15/561,026

(22) PCT Filed: Mar. 11, 2016

(86) PCT No.: PCT/CN2016/076169
§ 371 (c)(1),
(2) Date: Sep. 22, 2017

(87) PCT Pub. No.: WO2016/150308
PCT Pub. Date: Sep. 29, 2016

(65) Prior Publication Data
US 2018/0054246 A1 Feb. 22, 2018

(30) Foreign Application Priority Data

Mar. 24, 2015 (CN) .......................... 2015 1 0130888

(51) Int. Cl.
*H04B 7/08* (2006.01)
*H04W 72/12* (2009.01)
(Continued)

(52) U.S. Cl.
CPC ......... *H04B 7/0857* (2013.01); *H04L 1/0005* (2013.01); *H04L 1/0011* (2013.01);
(Continued)

(58) Field of Classification Search
None
See application file for complete search history.

(56) References Cited

U.S. PATENT DOCUMENTS

2009/0323641 A1   12/2009  Futagi et al.
2011/0136484 A1*   6/2011  Braun ................... H04W 24/10
                                                          455/422.1
(Continued)

FOREIGN PATENT DOCUMENTS

CN      101711058 A      5/2010
CN      102869109 A      1/2013
(Continued)

OTHER PUBLICATIONS

PCT International Search Report for Counterpart PCT Application No. PCT/CN2016/076169, 5pp. (including English translation), (May 23, 2016).

(Continued)

*Primary Examiner* — Christine T Duong
(74) *Attorney, Agent, or Firm* — Womble Bond Dickinson (US) LLP; Lester J. Vincent

(57) ABSTRACT

Disclosed in embodiments of the present invention are an MCS index determination method and base station equipment. The method comprises: calculating, by a base station equipment and according to a first SINR obtained by measuring an SRS signal at time $k_0$, a second SINR of a PUSCH signal; determining, by the base station equipment and according to the second SINR, a first MCS index; and calculating, by the base station equipment and according to the first MCS index and data volume actually required to be transmitted by a user, an actually scheduled PRB amount, and a second MCS index actually used. In an embodiment of the present invention, an MCS index of PUSCH matches an actual SINR of a PUSCH channel to effectively ensure receiving performance of the PUSCH, thereby increasing an (Continued)

uplink transmission efficiency of an LTE system, and particularly increasing an uplink transmission efficiency of a user near a cell edge, so as to ensure PUSCH transmission performance of a user near the cell edge or having a large path loss, and facilitate an increase in an uplink service rate of the edge user.

15 Claims, 3 Drawing Sheets

(51) Int. Cl.
  *H04L 27/26*    (2006.01)
  *H04L 1/00*     (2006.01)
  *H04L 1/20*     (2006.01)
  *H04L 5/00*     (2006.01)

(52) U.S. Cl.
  CPC .............. *H04L 1/20* (2013.01); *H04L 5/0044* (2013.01); *H04L 5/0064* (2013.01); *H04L 27/2602* (2013.01); *H04W 72/12* (2013.01)

(56) References Cited

U.S. PATENT DOCUMENTS

| | | | |
|---|---|---|---|
| 2011/0294439 | A1 | 12/2011 | Ofuji et al. |
| 2016/0088613 | A1* | 3/2016 | Li .......................... H04W 24/10 |
| | | | 370/329 |

FOREIGN PATENT DOCUMENTS

| | | | |
|---|---|---|---|
| CN | 102196495 B | * | 11/2013 |
| CN | 103701559 A | | 4/2014 |
| CN | 105142227 A | | 12/2015 |
| WO | WO 2012/020993 A2 | | 2/2012 |

OTHER PUBLICATIONS

PCT Written Opinion of the International Searching Authority for Counterpart PCT Application No. PCT/CN2016/076159, 3 pp., (dated May 23, 2016).

Extended European Search Report for EPO Counterpart Application No. 16767685.7, 7 pgs. (dated Feb. 14, 2018).

* cited by examiner

MCS INDEX DETERMINATION METHOD AND BASE STATION EQUIPMENT

CROSS-REFERENCE TO RELATED APPLICATIONS

This patent application is a U.S. National Phase Application under 35 U.S.C. § 371 of International Application No. PCT/CN2016/076169, filed on Mar. 11, 2016, entitled MCS INDEX DETERMINATION METHOD AND BASE STATION EQUIPMENT, which claims priority to Chinese Patent Application No. 201510130888.5, filed with the State Intellectual Property Office of People's Republic of China on Mar. 24, 2015, and entitled MCS Index. Determination Method and Base Station Equipment.

FIELD

The disclosure relates to the field of communication technology, in particular to an MCS index determination method and base station device.

BACKGROUND

An uplink adaptive technology in a Long Term Evolution (LTE) system is that: a base station device estimates quality of a Physical Uplink Shared Channel (PUSCH) of a user equipment (UE) according to quality of an uplink Sounding Reference Signal (SRS) of the UE, and chooses a Modulation and Coding Style (MCS) matching the UE channel quality when scheduling the PUSCH. In particular, the base station device estimates the Signal to Interference plus Noise Ratio (SINR) of the uplink channel quality of the UE according to the uplink SRS of the UE, and determines that the SINR obtained from the SRS measurement approximately equals to the SINR of the PUSCH of the UE, thereby determining the MCS index corresponding to the PUSCH of the UE. Moreover, when scheduling the UE, the base station device can determine the amount of Physical Resource Blocks (PRBs) to be scheduled for the PUSCH according to the MCS index and a data volume of the UE to be transmitted.

The MCS estimated according to the SRS is considered to be the MCS of the PUSCH, but in certain cases, the former does not equal to the latter, A terminal device is restricted by a maximum transmission power, but an SRS signal and a PUSCH signal may not be restricted by a maximum transmission power simultaneously, so the transmission power of a single PRB of an SRS signal and of a single PRB of a PUSCH signal may be different. For example, an SRS is provided with 96 PRBs; when a UE is at a distant point, due to large path loss, the uplink transmission power is restricted, and the actual transmission power of a single PRB falls short of expected power; whereas when the UE schedules a PUSCH, due to the small size of a data volume to be transmitted, the amount of PRBs actually to be scheduled for the PUSCH is small, so the transmission power of a single PRB of the PUSCH is higher than the transmission power of a single PRB of the SRS, namely, SINR of the PUSCH is greater than the SINR of the channel of the SRS; in other words, the SINR estimated according to the SRS cannot represent the SINR of the PUSCH, so it is inappropriate to equate the MCS estimated according to the SRS with the MCS for PUSCH scheduling.

Use of the same MCS index, no matter how many PRBs are finally scheduled for a PUSCH, is not always proper. When transmission power of the PUSCH is maximized, the actual received power of a single PRB does not equal to expected received power; when a different amount of PRBs of the PUSCH are scheduled, the transmission power of a single PRB is different, which is to say, the SINR of the PUSCH is different when the amount of PRBs is different. For example, 50 PRBs are scheduled first, and the power of each PRB is 6 dBm; 25 PRBs are scheduled later, and the power of each PRB is 9 dBm. If the same MCS is used in scheduling, the SINR used to determine the MCS would be different from the actual SINR of the PUSCH; for the PUSCH with transmission power of each scheduled PRB being 6 dBm, the MCS index used may be too high, whereas for the PUSCH with transmission power of each scheduled PRB being 9 dBm, the MCS index used may be too low.

If the amount of scheduled PRBs of a PUSCH is not restricted, receiving performance of a PUSCH at an edge of a ceil cannot be ensured. When a UE is at an edge of a cell and has a large path loss, and the uplink transmission power is restricted, the scheduled MCS index may be set to 0, but if the amount of scheduled PRBs of the PUSCH of the UE at an edge of a cell is not restricted, and 96 PRBs are scheduled, then received power of a single PRB of a base station device may be very low, and decoding may not be correct even if the scheduled MCS index is 0.

SUMMARY

Embodiments of the disclosure provide an MCS index determination method and a base station device to precisely compute an actually useable MCS index and the corresponding amount of PRBs when a certain data volume is to be transmitted by a UE, based on full consideration of the difference between an PUSCH bandwidth to be scheduled and an SRS bandwidth, as well as the restriction on the maximum transmission power of the terminal device.

The embodiments of the disclosure provide an MCS index determination method. The method includes:

computing, by a base station device, a second Signal to Interference plus Noise Ratio (SINR) of a Physical Uplink Shared Channel (PUSCH) signal according to a first SINR obtained by measuring an Sounding Reference Signal (SRS) signal at time $k_0$;

determining, by the base station device, a first MCS index according to the second SINR of the PUSCH signal; and computing, by the base station device, an amount of PRBs to be scheduled and a second MCS index to be used according to the first MCS index and a data volume to be transmitted by a UE.

Optionally, the process of computing, by a base station device, a second SINR of a PUSCH signal according to a first SINR obtained by measuring an SRS signal at time $k_0$ particularly includes: computing, by the base station device, the second SINR of the PUSCH signal according to the first SINR and power difference between a single Resource Element (RE) of the SRS signal and a single RE of the PUSCH signal.

Optionally, the process of computing, by the base station device, the second SINR of the PUSCH signal according to the first SINR and power difference between a single RE of the SRS signal and a single RE of the PUSCH signal particularly includes: computing, by the base station device, the second SINR of the PUSCH signal according to the following formula:

$$SINR'_{in}(k_0) = SINR_{in}(k_0) \cdot 10^{(P_{PUSCH\_RE\_max} - P_{SRS\_RE})/10};$$

where $SINR'_{in}(k_0)$ is the second SINR of the PUSCH signal, $SINR_{in}(k_0)$ is the first SINR, and $P_{PUSCH\_RE\_max} - P_{SRS\_RE}$ is the power difference between a single RE of the SRS signal and a single RE of the PUSCH signal Optionally, the method further includes:

computing, by the base station device, the power difference between a single RE of the SRS signal and a single RE of the PUSCH signal according to a Power Headroom Report (PHR) parameter and an SRS parameter, and computing difference between power of a single RE when a terminal device transmits the PUSCH with the transmission power of a single PRB being expected power and power of a signal RE when the terminal device transmits the PUSCH with a preset amount of PRBs.

Optionally, the process of computing, by the base station device, the power difference between a single RE of the SRS signal and a single RE of the PUSCH signal according to a PHR parameter and an SRS parameter, and computing difference between power of a single RE when a terminal device transmits the PUSCH with the transmission power of a single PRB being the expected power and power of a signal RE when the terminal device transmits the PUSCH with a preset amount of PRB, includes;

computing $P_{PUSCH\_RE\_max} - P_{SRS\_RE} = -(P_{SRS\_OFFSET} + 3)$ and $P_{PUSCH\_RE\_max\_noLimt} - P_{PUSCH\_RE\_max} = 0$, by the base station device, if total transmission power of the SRS signal fails to reach a maximum value, and total transmission power of the PUSCH with a preset amount of PRBs fails to reach the maximum value; or, computing $P_{PUSCH\_RE\_max} - P_{SRS\_RE} = 10 \log_{10}(M_{SRS}) - 10 \log_{10}(PRB\_MAX) - 3$ and $P_{PUSCH\_RE\_max\_noLimt} - P_{PUSCH\_RE\_max} = 10 \log_{10}(PRB\_MAX) - 10 \log_{10}(M_{PUSCH}(i)) - PH(i)$, by the base station device, if the total transmission power of the SRS signal reaches the maximum value, and the total transmission power of the PUSCH with the preset amount of PRBs reaches the maximum value; or, computing $P_{PUSCH\_RE\_max} - P_{SRS\_RE} = PH(i) + 10 \log_{10}(M_{PUSCH}) - 10 \log_{10}(PRB\_MAX) - (P_{SRS\_OFFSET} + 3)$ and $P_{PUSCH\_RE\_max\_noLimt} - P_{PUSCH\_RE\_max} = 10 \log_{10}(PRB\_MAX) - 10 \log_{10}(M_{PUSCH}(i)) - PH(i)$, by the base station device, if the total transmission power of the SRS signal fails to reach the maximum value, and the total transmission power of the PUSCH with the preset amount of PRBs reaches the maximum value; or, computing $P_{PUSCH\_RE\_max} - P_{SRS\_RE} = 10 \log_{10}(M_{SRS}) - 10 \log_{10}(M_{PUSCH}(i)) = PH(i) - 3$ and $P_{PUSCH\_RE\_max\_noLimt} - P_{PUSCH\_RE\_max} = 0$, by the base station device, if the total transmission power of the SRS signal reaches the maximum value, and the total transmission power of PUSCH with the preset amount of PRBs fails to reach the maximum value;

where $P_{PUSCH\_RE\_max} - P_{SRS\_RE}$ is power difference between a single RE of the SRS signal and a single RE of the PUSCH signal; $P_{PUSCH\_RE\_max\_noLimt} - P_{PUSCH\_RE\_max}$ is the difference between the power of a single RE when the terminal device transmits the PUSCH with the transmission power of a single PRB being the expected power and the power of a signal RE when the terminal device transmits the PUSCH with the preset amount of PRBs; $P_{SRS\_OFFSET}$ is power offset of the SRS signal; $M_{SRS}$ is the bandwidth of the SRS signal; PRB_MAX is the preset amount of PRBs; $M_{PUSCH}(i)$ is the amount of PRBs at time i of the PUSCH, which carries the PHR of the terminal device; PH(i) is the PHR reported by the terminal device at time i.

Optionally, computing, by the base station device, an amount of PRBs to be scheduled and a second MCS index to be used according to the first MCS index and a data volume to be transmitted by a UE, includes:

operation A, computing, by the base station device, a maximum supportable Transport Block Size (TBS) according to MCS_init_noLimt($k_0$) and PRB_MAX_noLimt; if the data volume to be transmitted by the UE is smaller than or equal to the maximum TBS, computing the second MCS index $MCS_{INDEX}$ to be MCS_init_noLimt($k_0$), obtaining the amount of PRBs required in scheduling through computation according to the second MCS index, and ending the process, or, if the data volume to be transmitted by the UE is greater than the maximum TBS, executing operation B;

operation B, obtaining, by the base station device, MCS_actual_b and computing MCS_actual_a=MCS_actual_b+$\Delta$ by the base station device; if ($MCS_{actual_a} - MCS_{actual_b}$)≤$MCS_{diff}$, executing operation C, otherwise, computing MCS_actual_b=MCS_actual_a and repeating operation B; where the initial value of MCS_actual_b is MCS_init_sche_max, and $\Delta = 10 \cdot \log_{10}(PRB\_MAX/PRB\_NUM) - 10 \cdot \log_{10}(PRB\_MAX/PRB\_MAX\_scheduled)$; and operation C, computing, by the base station device, the second MCS index $MCS_{index}$=MCS_actual_a, obtaining the amount of PRBs required in scheduling according to the second MCS index, and ending the process;

where MCS_init_noLimt($k_0$) is the first MCS index when a single PRB is transmitted at the expected power at time $k_0$; PRB_MAX_noLimt is the amount of PRBs to be scheduled when the transmission power of the terminal device reaches the maximum value and a single PRB is transmitted at the expected power; MCS_diff is an MCS difference threshold to terminate an iterative calculation; MCS_init_sche_max is an MCS index supportable when the maximum amount of PRBs to be scheduled is PRB_MAX_scheduled; PRB_MAX_scheduled is the maximum schedulable amount of PRBs computed according to an MCS index restriction; PRB_MAX is the preset amount of PRBs; PRB_NUM is the amount of PRBs required for transmitting the UE data, computed according to MCS_actual_b.

Optionally, the method further includes:

computing, by the base station device, PRB_MAX_scheduled and the MCS index MCS_init_sche_max, according to the first MCS index $MCS_{init}$ and a pre-configured minimum MCS index target_MCS.

Optionally, the process of computing, by the base station device, PRB_MAX_scheduled and the MCS index MCS_init_sche_max, by the base station according to the first MCS index $MCS_{init}$ and a pre-configured minimum MCS index target_MCS includes:

if $MCS_{init}$<target_MCS, computing, by the base station device, the maximum amount of PRBs allowed to be scheduled, $$PRB\_tmp = \frac{PRB\_MAX}{10^{\left(\frac{target_{MCS} - MCS_{init}(k_0)}{10}\right)}};$$

if PRB_tmp≥PRB_MAX_noLimt, computing, by the base station device, PRB_MAX_scheduled=PRB_tmp and MCS_init_sche_max=target_MCS, and if PRB_tmp<PRB_MAX_noLimt, computing, by the base station device, PRB_MAX_scheduled=PRB_MAX_noLimt, MCS_init_noLimt($k_0$)=MCS_init($k_0$)+$P_{PUSCH\_RE\_max\_noLimt} - P_{PUSCH\_RE\_max}$, and MCS_init_sche_max=MCS_init_noLimt($k_0$); or, if $MCS_{init}$≥target_MCS, computing, by the base station device, PRB_MAX_scheduled=PRB_MAX, and MCS_init_sche_max=MCS_init($k_0$); where MCS_init($k_0$) is the first MCS index at time $k_0$, and $P_{PUSCH\_RE\_max\_noLimt}$–$P_{PUSCH\_RE\_max}$ is the difference between the power of a single RE when the terminal device transmits the PUSCH with the transmission power of a single PRB being the expected power and the power of a signal RE when the terminal device transmits the PUSCH with the preset amount of PRBs.

Embodiments of the disclosure provide a base station device. The base station device includes:

a first computation module, configured to compute a second SINR of a PUSCH signal according to a first SINR obtained by measuring an SRS signal at time $k_0$;

a determination module, configured to determine a first MCS index according to the second SINR of the PUSCH signal; and a second computation module, configured to compute an amount of PRBs to be scheduled and a second MCS index to be used according to the first MCS index and a data volume to be transmitted by a UE.

Optionally, the first computation module is further configured to compute the second SINR of the PUSCH signal according to the first SINR and power difference between a single RE of the SRS signal and a single RE of the PUSCH signal.

Optionally, the first computation module is further configured to compute the second SINR of the PUSCH signal according to the following formula:

$$SINR'_{in}(k_0) = SINR_{in}(k_0) \cdot 10^{(P_{PUSCH\_RE\_max} - P_{SRS\_RE})/10};$$

where SINR'$_{in}$($k_0$) is the second SINR of the PUSCH signal, SINR$_{in}$($k_0$) is the first SINR, and $P_{PUSCH\_RE\_max}$–$P_{SRS\_RE}$ the power difference between a single RE of the SRS signal and a single RE of the PUSCH signal.

Optionally, the first computation module is also configured to compute the power difference between a single RE of the SRS signal and a single RE of the PUSCH signal according to a PHR parameter and an SRS parameter, and to compute difference between power of a single RE when a terminal device transmits the PUSCH with the transmission power of a single PRB being expected power and power of a signal RE when the terminal device transmits the PUSCH with a preset amount of PRB.

Optionally, the first computation module is further configured to, compute $P_{PUSCH\_RE\_max}$–$P_{SRS\_RE}$=–($P_{SRS\_OFFSET}$+3) and $P_{PUSCH\_RE\_max\_noLimt}$–$P_{PUSCH\_RE\_max}$=0, by the base station device, if total transmission power of the SRS signal fails to reach a maximum value, and total transmission power of the PUSCH with a preset amount of PRBs fails to reach the maximum value; or, compute $P_{PUSCH\_RE\_max}$–$P_{SRS\_RE}$=10 log$_{10}$($M_{SRS}$)–10 log$_{10}$(PRB_MAX)–3 and $P_{PUSCH\_RE\_max\_noLimt}$–$P_{PUSCH\_RE\_max}$=10 log$_{10}$(PRB_MAX)–10 log$_{10}$($M_{PUSCH}$(i))–PH(i), by the base station device, if the total transmission power of the SRS signal reaches the maximum value, and the total transmission power of the PUSCH with the preset amount of PRBs reaches the maximum value; or, compute $P_{PUSCH\_RE\_max}$–$P_{SRS\_RE}$=PH(i)+10 log$_{10}$($M_{PUSCH}$)–10 log$_{10}$(PRB_MAX)–($P_{SRS\_OFFSET}$+3) and $P_{PUSCH\_RE\_max\_noLimt}$–$P_{PUSCH\_RE\_max}$=10 log$_{10}$(PRB_MAX)–10 log$_{10}$($M_{PUSCH}$(i))–PH(i), by the base station device, if the total transmission power of the SRS signal fails to reach the maximum value, and the total transmission power of the PUSCH with the preset amount of PRBs reaches the maximum value; or, compute $P_{PUSCH\_RE\_max}$–$P_{SRS\_RE}$=10 log$_{10}$($M_{SRS}$)–10 log$_{10}$($M_{PUSCH}$(i))–PH(i)–3 and $P_{PUSCH\_RE\_max\_noLimt}$–$P_{PUSCH\_RE\_max}$=0, by the base station device, if the total transmission power of the SRS signal reaches the maximum value, and the total transmission power of PUSCH with the preset amount of PRBs fails to reach the maximum value;

where $P_{PUSCH\_RE\_max}$–$P_{SRS\_RE}$ is the power difference between a single RE of the SRS signal and a single RE of the PUSCH signal; $P_{PUSCH\_RE\_max\_noLimt}$–$P_{PUSCH\_RE\_max}$ is the difference between the power of a single RE when the terminal device transmits the PUSCH with the transmission power of a single PRB being the expected power and the power of a signal RE when the terminal device transmits the PUSCH with the preset amount of PRBs; $P_{SRS\_OFFSET}$ is the power offset of the SRS signal; $M_{SRS}$ is the bandwidth of the SRS signal; PRB_MAX is the preset amount; $M_{PUSCH}$(i) is the amount of PRBs at time i of the PUSCH, which carries the PHR of the terminal device; PH(i) is the PHR reported by the terminal device at time i.

Optionally, the second computation module is particularly configured to compute an amount of PRBs to be scheduled and a second MCS index to be used according to the following operations:

operation A, computing a maximum supportable Transport Block Size (TBS) according to MCS_init_noLimt($k_0$) and PRB_MAX_noLimt; if the data volume to be transmitted by the UE is smaller than or equal to the maximum TBS, computing the second MCS index MCS$_{index}$ to be MCS_init_noLimt($k_0$), obtaining the amount of PRBs required in scheduling through computation according to the second MCS index, and ending the process, or, if the data volume to be transmitted by the UE is greater than the maximum TBS, executing operation B;

operation B, obtaining MCS_actual_b and computing MCS_actual_a=MCS_actual_b+Δ by the base station device; if (MCS$_{actual_a}$–MCS$_{actual_b}$)≤MCS$_{diff}$, executing operation C, otherwise, computing MCS_actual_b=MCS_actual_a, and repeating operation B; where the initial value of MCS_actual_b is MCS$_{13}$ init_sche_max, and Δ=10·log$_{10}$(PRB_MAX/PRB_NUM)–10·log$_{10}$(PRB_MAX/PRB_MAX_scheduled); and operation C, computing the second MCS index MCS$_{index}$=MCS_actual_a, obtaining the amount of PRBs required in scheduling according to the second MCS index, and ending the process;

where MCS_init_noLimt($k_0$) is the first MCS index when a single PRB is transmitted at the expected power at time $k_0$; PRB_MAX_noLimt is the amount of PRBs to be scheduled when the transmission power of the terminal device reaches the maximum value and a single PRB is transmitted at the expected power; MCS_diff is an MCS difference threshold to terminate an iterative calculation; MCS_init_sche_max is an MCS index supportable when the maximum amount of PRBs to be scheduled is PRB_MAX_scheduled; PRB_MAX_scheduled is the maximum schedulable amount of PRBs computed according to an MCS index restriction; PRB_MAX is the preset amount of PRBs; PRB_NUM is the amount of PRBs required for transmitting the UE data, computed according to MCS_actual_b.

Optionally, the second computation module is also configured to compute PRB_MAX_scheduled and MCS index and the MCS index MCS_init_sche_max, according to the first MCS index MCS$_{init}$ and a pre-configured minimum MCS index target_MCS.

Optionally, the second computation module is further configured to, if $MCS_{init}$<target_MCS, compute the maximum amount of PRBs allowed to be scheduled, $$PRB\_tmp = \frac{PRB\_MAX}{10^{\left(\frac{target_{MCS} - MCS_{init}(k_0)}{10}\right)}};$$

if PRB_tmp≥PRB_MAX_noLimt, compute PRB_MAX_scheduled=PRB_tmp and MCS_init_sche_max=target_MCS, and if PRB_tmp<PRB_MAX_noLimt, compute PRB_MAX_scheduled=PRB_MAX_noLimt, MCS_init_noLimt($k_0$)=MCS_init($k_0$)+$P_{PUSCH\_RE\_max\_noLimt}$−$P_{PUSCH\_RE\_max}$, and MCS_init_sche_max=MCS_init_noLimt($k_0$); or, if $MCS_{init}$≥target_MCS, compute PRB_MAX_scheduled=PRB_MAX, and MCS_init_sche_max=MCS_init($k_0$); where MCS_init($k_0$) is the first MCS index at time $k_0$, and $P_{PUSCH\_RE\_max\_noLimt}$−$P_{PUSCH\_RE\_max}$ is the difference between the power of a single RE when the terminal device transmits the PUSCH with the transmission power of a single PRB being the expected power and the power of a signal RE when the terminal device transmits the PUSCH with the preset amount of PRBs.

In order to solve the above mentioned problem, the embodiment of the disclosure further discloses a computer-readable code, where when the computer-readable code is executed on a base station, the base station is configured to execute the MCS index determination method according to any one of the claims set forth in the Patent Claims.

In order to solve the above mentioned problem, embodiments of the disclosure farther discloses a computer-readable medium which stores the computer program claimed to be protected as set forth in the Patent Claims.

Compared with the prior art, the embodiments of the disclosure at least have the advantages that: in the embodiments of the disclosure, the amount of PRBs and transmission power of the terminal device are considered when the MCS of the PUSCH is computed; the MCS index corresponding to the PUSCH scheduling a certain amount of PRBs is precisely computed, so that the MCS index of the PUSCH matches the actual SINR of the PUSCH channel, avoiding the problem that in the prior art, when the transmission power of the terminal device is restricted, inconformity between the amounts of PRBs of SRS and of PUSCH causes different SINRs, but the scheduled MCS remains the same, solving the problem that when the transmission power of the terminal device is restricted, PUSCHs scheduling different amounts of PRBs correspond to different SINRs but the scheduled MCS remains the same, and effectively ensuring receiving performance of the PUSCH, thereby improving the uplink transmission efficiency of the LTE system. Moreover, the uplink transmission power of a UE at a cell edge is usually restricted, and the technical solution according to embodiments of the disclosure solves the problem of improper selection of MCS of PUSCH under such a circumstance; therefore, the technical solution is particularly conducive to improving the uplink transmission efficiency of a UE at a ceil edge. In addition, the technical solution restricts the minimum MCS index for uplink scheduling, reduces the maximum schedulable amount of PRBs, ensures the PUSCH transmission performance of a UE at a cell edge with a large path loss, avoids the problem of completely wrong decoding caused by an excessive amount of PRBs scheduled and too low an SINR of a single PRB, and helps to improve the uplink service rate of a cell edge UE.

BRIEF DESCRIPTION OF THE DRAWINGS

In order to describe the technical scheme of embodiments of the disclosure more clearly, brief introduction will be given to the figures used in the descriptions of embodiments of the disclosure. Apparently, the figures used in the descriptions are only some embodiments of the disclosure. For those skilled in the art, without creative labors, other figures can be obtained according to the figures used in embodiments of the disclosure.

DETAILED DESCRIPTION OF THE EMBODIMENTS

The technical scheme in embodiments of the disclosure will be clearly and completely described hereunder according to the figures. Apparently, embodiments described herein are only a part of all the embodiments. All other embodiments obtained by those skilled in the art without paying creative labors based on embodiments of the disclosure fall into the scope protected by the disclosure.

First Embodiment

To solve the problems existed in the prior art, a first embodiment of the disclosure provides an MCS index determination method, which precisely estimates an uplink scheduled MCS and the corresponding PRB amount. Before describing the technical scheme according to the embodiment of the disclosure, the following relevant parameters can be defined. PRB_MAX: a preset amount of PRBs, which could equal to a maximum amount of PRBs which can be scheduled by a base station device, with a recommended value of 96. PH(i): PHR reported by a terminal device at time i. $M_{PUSCH}(i)$: the amount of PRBs at time i of a PUSCH carrying the PHR of the terminal device. $M_{SRS}$: bandwidth of an SRS (namely the amount of PRBs). $P_{SRS\_offset}$: power offset of the SRS, whose value is a configuration parameter. PRB_MAX_noLimt: the amount of PRBs to be scheduled when transmission power of the terminal device is $P_{CMAX}$ (maximum transmission power). $P_{SRS\_RE}$: transmission power of a single RE of the SRS signal. $P_{PUSCH\_RE\_phr}$: transmission power of a single RE when the amount of PRBs to be scheduled by the base station device is $M_{PUSCH}(i)$. $P_{PUSCH\_RE\_max}$: transmission power of a single RE when the amount of PRBs to be scheduled by the base station device is PRB_MAX. $P_{PUSCH\_RE\_max\_noLimt}$: transmission power of a single RE of a PUSCH when the power is just big enough to be restricted, namely, the transmission power of a single RE when the terminal device transmits the PUSCH with the transmission power of a single PRB being expected power. $MCS_{init}$: a corresponding MCS index when the amount of PRBs to be scheduled by the base station device is PRB_MAX. PRB_MAX_scheduled: the maximum amount of PRBs that can be scheduled by the base station device according to an MCS index actually used. MCS_init_sche_max: an MCS index that can be supported when the maximum amount (PRB_MAX_scheduled) of PRBs are scheduled by the base station device, PRB_scheduled: the amount of PRBs actually to be scheduled by the base station device according to a wave number of terminal device and an MCS index, MCS_diff: an MCS difference threshold to terminate an iterative calculation.

Figure 1:
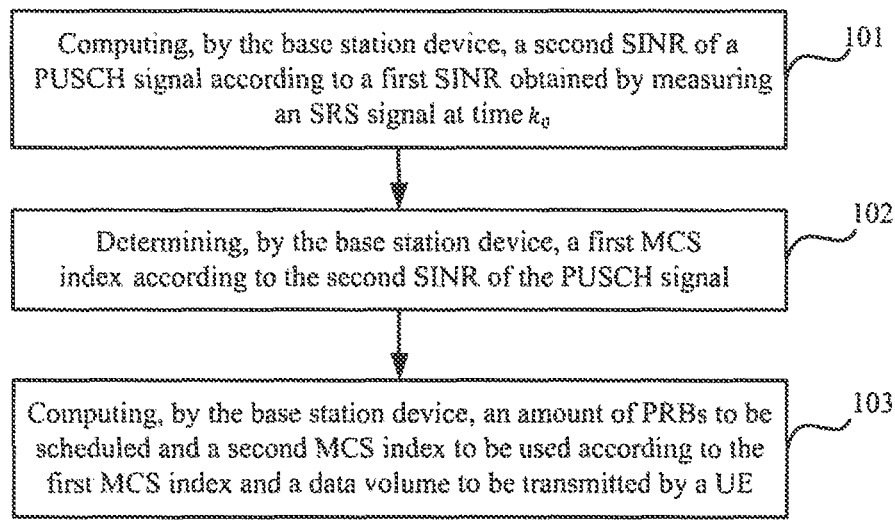
FIG. 1 is a schematic flowchart of an MCS index determination method according to a first embodiment of the disclosure.

Under the mentioned context of use, as shown in FIG. 1, the MCS index determination method includes the following operations.

Operation 101 includes computing, by the base station device, a second SINR (e.g., $SINR'_{in}(k_0)$) of a PUSCH signal (the amount of PRBs is PRB_MAX) according to a first SINR (e.g. $SINR_{in}(k_0)$) obtained by measuring an SRS signal at time $k_0$.

In the embodiment of the disclosure, the process of computing, by the base station device, a second SINR (e.g., $SINR'_{in}(k_0)$) of a PUSCH signal (the amount of PRBs is PRB_MAX) according to a first SINR (e.g., $SINR_{in}(k_0)$) obtained by measuring an SRS signal at time $k_0$ computing, by the base station particularly includes, but is not limited to: computing, by the base station device, the second SINR of the PUSCH signal according to the first SINR, and the power difference between a single RE of the SRS signal and a single RE of the PUSCH signal.

Particularly, the process of computing, by the base station device, the second SINR of the PUSCH signal according to the first SINR, and the power difference between a single RE of the SRS signal and a single RE of the PUSCH signal includes: computing the second SINR of the PUSCH signal by the base station device according to the following formula:

$$SINR'_{in}(k_0) = SINR_{in}(k_0) \cdot 10^{(P_{PUSCH\_RE\_max} - P_{SRS\_RE})/10};$$

where $SINR'_{in}(k_0)$ is the second SINR of the PUSCH signal, $SINR_{in}(k_0)$ is the first SINR, and $P_{PUSCH\_RE\_max} - P_{SRS\_RE}$ is the power difference between a single RE of the SRS signal and a single RE of the PUSCH signal.

In the embodiment of the disclosure, before operation 101 is executed, the base station device can also compute the power difference between a single RE of the SRS signal and a single RE of the PUSCH signal (the amount of PRBs is PRB_MAX) according to a PHR parameter and an SRS parameter, and compute difference between power of a single RE when a terminal device transmits the PUSCH with the transmission power of a single PRB being expected power and power of a signal RE when the terminal device transmits the PUSCH with the preset amount (PRB_MAX) of PRBs; where, the computation can happen only at the time of SRS reporting, and the PHR value reported most recently shall be adopted.

In the embodiment of the disclosure, the process that the base station device can also compute the power difference between a single RE of the SRS signal and a single RE of the PUSCH signal (the amount of PRBs is PRB_MAX) according to a PHR parameter and an SRS parameter, and compute difference between power of a single RE when a terminal device transmits the PUSCH with the transmission power of a single PRB being the expected power and power of a signal RE when the terminal device transmits the PUSCH with a preset amount (PRB_MAX) of PRBs particularly includes, without limitation to, the following cases.

A first case: If the total transmission power of the SRS signal fails to reach the maximum value, and the total transmission power of the PUSCH with a preset amount (i.e., PRB_MAX) of PRBs fails to reach the maximum value, namely, $PH(i) \geq 10 \log_{10}(M_{SRS}) + P_{SRS\_OFFSET} - 10 \log_{10}(M_{PUSCH}(i))$ and $PH(i) \geq 10 \log_{10}(PRB\_MAX) - 10 \log_{10}(M_{PUSCH}(i))$, then the base station device computes $P_{PUSCH\_RE\_max} - P_{SRS\_RE} = -(P_{SRS\_OFFSET} + 3)$ and $P_{PUSCH\_RE\_max\_noLimt} - P_{PUSCH\_RE\_max} = 0$.

A second case: If the total transmission power of the SRS signal reaches the maximum value, and the total transmission power of the PUSCH with a preset amount (i.e., PRB_MAX) of PRBs reaches the maximum value, namely $PH(i) < 10 \log_{10}(M_{SRS}) + P_{SRS\_OFFSET} - 10 \log_{10}(M_{PUSCH}(i))$ and $PH(i) < 10 \log_{10}(PRB\_MAX) - 10 \log_{10}(M_{PUSCH}(i))$, then the base station device computes $P_{PUSCH\_RE\_max} - P_{SRS\_RE} = 0 \log_{10}(M_{SRS}) - 10 \log_{10}(PRB\_MAX) - 3$ and $P_{PUSCH\_RE\_max\_noLimt} - P_{PUSCH\_RE\_max} = 10 \log_{10}(PRB\_MAX) - 10 \log_{10}(M_{PUSCH}(i)) - PH(i)$. Moreover, when the total transmission power of the PUSCH just reaches the maximum value with the transmission power of a single PRB being the expected power, the base station device can also compute the amount of PRBs to be amount of $PRB\_MAX\_noLimt = M_{PUSCH}(i) \cdot 10^{PH(i)/10}$.

A third case: If the total transmission power of the SRS signal fails to reach the maximum value, and the total transmission power of the PUSCH with a preset amount (i.e., PRB_MAX) of PRBs reaches the maximum value, namely, $PH(i) \geq 10 \log_{10}(M_{SRS}) + P_{SRS\_OFFSET} - 10 \log_{10}(M_{PUSCH}(i))$ and $PH(i) < 10 \log_{10}(PRB\_MAX) - 10 \log_{10}(M_{PUSCH}(i))$, then the base station device computes $P_{PUSCH\_RE\_max} - P_{SRS\_RE} = PH(i) + 10 \log_{10}(M_{PUSCH}) - 10 \log_{10}(PRB\_MAX) - (P_{SRS\_OFFSET} + 3)$ and $P_{PUSCH\_RE\_max\_noLimt} - P_{PUSCH\_RE\_max} = 10 \log_{10}(PRB\_MAX) - 10 \log_{10}(M_{PUSCH}(i)) - PH(i)$. Moreover, when the total transmission power of the PUSCH just reaches the maximum value with the transmission power of a single PRB being the expected power, the base station device can also compute the amount of PRBs to be $PRB\_MAX\_noLimt = M_{PUSCH}(i) \cdot 10^{PH(i)/10}$.

A fourth case: If the total transmission power of the SRS signal reaches the maximum value, and the total transmission power of the PUSCH with a preset amount (i.e., PRB_MAX) of PRBs fails to reach the maximum value, namely $PH(i) < 10 \log_{10}(M_{SRS}) + P_{SRS\_OFFSET} - 10 \log_{10}(M_{PUSCH}(i))$ and $PH(i) \geq 10 \log_{10}(PRB\_MAX) - 10 \log_{10}(M_{PUSCH}(i))$, then the base station device computes $P_{PUSCH\_RE\_max} - P_{SRS\_RE} = 10 \log_{10}(M_{SRS}) - 10 \log_{10}(M_{PUSCH}(i)) - PH(i) - 3$ and $P_{PUSCH\_RE\_max\_noLimt} - P_{PUSCH\_RE\_max} = 0$.

In the embodiment of the disclosure, under the four cases, $P_{PUSCH\_RE\_max} - P_{SRS\_RE}$ is the power difference between a single RE of the SRS signal and a single RE of the PUSCH signal; $P_{PUSCH\_RE\_max\_noLimt} - P_{PUSCH\_RE\_max}$ is the difference between the power of a single RE when the terminal device transmits the PUSCH with the transmission power of a single PRB being the expected power and the power of a signal RE when the terminal device transmits the PUSCH with the preset amount (i.e., PRB_MAX) of PRBs; $P_{SRS\_OFFSET}$ is the power offset of the SRS signal; $M_{SRS}$ is the bandwidth of the SRS signal; PRB_MAX is the preset amount; $M_{PUSCH}(i)$ is the amount of PRBs at time i of the PUSCH, which carries the PHR of the terminal device; PH(i) is the PHR reported by the terminal device at time i.

Operation 102 includes determining a first MCS index by the base station device according to the second SINR of the PUSCH signal, namely determining the scheduled MCS index $MCS_{init}$ according to $SINR'_{in}(k_0)$ of the PUSCH (the amount of PRBs is PRB_MAX).

Operation 103 includes computing the amount of PRBs actually to be scheduled (PRB_scheduled) and the second MCS index ($MCS_{index}$) actually to be used, by the base station device, according to the first MCS index and the data volume actually required to be transmitted by the UE.

In the embodiment of the disclosure, the process of computing the amount of PRBs actually to be scheduled and the second MCS index actually to be used, by the base station device, according to the first MCS index and the data volume actually required to be transmitted by the UE. includes:

operation A, computing, by the base station device, a maximum supportable Transport Block Size (TBS) according to $MCS\_init\_noLimt(k_0)$ and PRB_MAX_noLimt; computing the second MCS index $MCS_{index}$ to be $MCS\_init\_noLimt(k_0)$, obtaining the amount of PRBs actually required in scheduling through computation according to the second MCS index, and ending the process, if the data volume actually required to be transmitted by the UE is smaller than or equal to the maximum TBS; or executing operation B, if the actual data volume required to be transmitted by the UE is greater than the maximum TBS;

operation B, obtaining MCS_actual_b and computing MCS_actual_a=MCS_actual_b+Δ by the base station device; executing operation C if (MCS_actual_a−MCS_actual_b)≤MCS_diff; otherwise, computing MCS_actual_b−MCS_actual_a and repeating operation B by the base station device; the initial value of MCS_actual_b is MCS_init_sche_max, and Δ=10·log$_{10}$(PRB_MAX/PRB_NUM)−10·log$_{10}$(PRB_MAX/PRB_MAX_scheduled); and operation C, computing the second MCS index $MCS_{index}$=MCS_actual_a, obtaining the amount of PRBs actually required in scheduling, PRB_scheduled, according to the second MCS index, and ending the process by the base station device;

where, the initial MCS index, MCS_actual_b, equals to MCS_init_sche_max, and the amount of PRBs required for transmitting the UE data, is computed and recorded as PRB_NUM, and then PRB_NUM=min(PRB_NUM, PRB_MAX_scheduled. Besides, $MCS\_init\_noLimt(k_0)$ is the first MCS index when a single PRB is transmitted at expected power level at time $k_0$; PRB_MAX_noLimt is the amount of PRBs to be scheduled when the transmission power of the terminal device reaches the maximum value and a single PRB is transmitted at the expected power; MCS_diff is the MCS difference threshold to terminate an iterative calculation; MCS_init_sche_max is the MCS index supportable when the maximum amount of PRBs to be scheduled is PRB_MAX_scheduled; PRB_MAX_scheduled is the maximum schedulable amount of PRBs computed according to a certain MCS index restriction; PRB_MAX is the preset amount of PRBs; PRB_NUM is the amount of PRBs required for transmitting the UE data, computed according to MCS_actual_b.

In the embodiment of the disclosure, the base station device can also compute PRB_MAX_scheduled and MCS_init_sche_max according to the first MCS index $MCS_{init}$ and a pre-configured minimum MCS index target_MCS.

Particularly, too low an MCS index would not be good for improving the system transmission efficiency, so the scheduled minimum MCS index is restricted to be target_MCS. The maximum schedulable amount of PRBs PRB_MAX_scheduled and the MCS index MCS_init_sche_max used for scheduling the maximum amount of PRBs are computed according to the first MCS index $MCS_{init}$ and the pre-configured minimum MCS index target_MCS. If the corresponding MCS index of the PUSCH when a single PRB is transmitted at the current expected power cannot reach target_MCS, an MCS index corresponding to the current expected power level of the terminal device shall be taken as MCS_init_sche_max.

In the embodiment of the disclosure, the process that the maximum schedulable amount of PRBs PRB_MAX_scheduled and the MCS index MCS_sche_max used for scheduling the maximum amount of PRBs are computed according to the first MCS index $MCS_{init}$ and the pre-configured minimum MCS index target_MCS, by the base station device particularly includes, without limitation to, the following modes:

if $MCS_{init}$<target_MCS, then the base station device computes the maximum amount of PRBs allowed to be scheduled, $$PRB\_tmp = \frac{PRB\_MAX}{10\Delta\left(\frac{target_{MCS} - MCS_{init}(k_0)}{10}\right)};$$

if PRB_tmp≥PRB_MAX_noLimt, then the base station device computes PRB_MAX_scheduled=PRB_tmp and MCS_init_sche_max=target_MCS; if PRB_tmp<PRB_MAX_noLimt, the base station device computes PRB_MAX_scheduled=PRB_MAX_noLimt $MCS\_init\_noLimt(k_0)$=$MCS\_init(k_0)$+$P_{PUSCH\_RE\_noLimt}$−$P_{PUSCH\_RE\_max}$, and MCS_init_sche_max=target_MCS_init_noLimt($k_0$); or, if $MCS_{init}$≥target_MCS, then the base station device computes PRB_MAX_scheduled=PRB_MAX, and MCS_init_sche_max=MCS_init($k_0$); where MCS_init($k_0$) is the first MCS index at time $k_0$, and $P_{PUSCH\_RE\_noLimt}$−$P_{PUSCH\_RE\_max}$ is the difference between the power of a single RE when the terminal device transmits the PUSCH with the transmission power of a single PRB being the expected power and the power of a signal RE when the terminal device transmits the PUSCH with the preset amount (PRB_MAX) of PRBs.

In conclusion, in the embodiment of the disclosure, when the SINR of the received PUSCH signal is determined according to the SINR of the SRS signal, the difference between the amount of PRBs of the PUSCH and the amount of PRBs of the SRS is considered and converted into the SINR corresponding to the transmission power of the PUSCH; because the amount of PRBs of PUSCH to be scheduled is different in each Transmission Time Interval (TTI) in the uplink transmission, a supportable MCS index is computed according to the maximum amount of PRBs of the PUSCH to be scheduled (defined as PRB_MAX herein), and is taken as an initial MCS index in scheduling, namely, the initial scheduled MCS is corresponding to the maximum amount of PRBs of PUSCH to be scheduled and is estimated according to the amount of PRBs of PUSCH to be scheduled, and the actual MCS finally scheduled by the UE is also determined according to the actual amount of PRBs transmitted by the UE. Too low an MCS index would be not good for improving the system transmission efficiency, so the minimum scheduled MCS index is restricted; if the initial MCS index is smaller than the minimum MCS index, the initial scheduled MCS shall be computed again, and if the expected power allows, the initial MCS is restricted by the minimum MCS index, and the maximum amount of schedulable PRBs is reduced. During the scheduling by the UE, the required amount of PRBs is first computed according to the initial MCS index and the data volume required to be transmitted; if the required amount of PRBs is small, the power of a single PRB of the PUSCH may change, namely, the schedulable MCS index may change, then the required amount of PRBs may be computed again according to a new MCS index; such an iterative calculation may be repeated until the most appropriate MCS index and amount of PRBs for data transmission are acquired.

Compared with the prior art, the embodiments of the disclosure at least have the following advantages: in the embodiments of the disclosure, the amount of PRBs and transmission power of the terminal device are considered when the MCS of the PUSCH is computed; the MCS index corresponding to the PUSCH scheduling a certain amount of PRBs is precisely computed, so that the MCS index of the PUSCH matches the actual SINR of the PUSCH channel, avoiding the problem that in the prior art, when the transmission power of the terminal device is restricted, inconformity between the amounts of PRBs of SRS and of PUSCH causes different SINRs, but the scheduled MCS remains the same, solving the problem that when the transmission power of the terminal device is restricted, PUSCHs scheduling different amounts of PRBs correspond to different SINRs but the scheduled MCS remains the same, and effectively ensuring receiving performance of the PUSCH, thereby improving the uplink transmission efficiency of the LTE system. Moreover, the uplink transmission power of a UE at a cell edge is usually restricted, and the technical solution according to embodiments of the disclosure solves the problem of improper selection of MCS of PUSCH under such a circumstance; therefore, the technical solution is particularly conducive to improving the uplink transmission efficiency of a UE at a cell edge. In addition, the technical solution restricts the minimum MCS index for uplink scheduling, reduces the maximum schedulable amount of PRBs, ensures the PUSCH transmission performance of a UE at a cell edge with a large path loss, avoids the problem of completely wrong decoding caused by an excessive amount of PRBs to be scheduled and too low an SINR of a single PRB, and helps to improve the uplink service rate of a UE at a cell edge.

Second Embodiment

Figure 2:
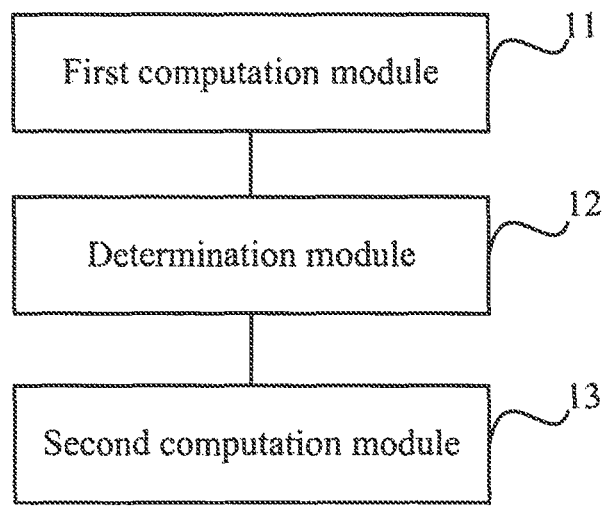
FIG. 2 is a schematic structural diagram of a base station device according to a second embodiment of the disclosure.

Based on the same inventive conception, embodiments of the disclosure also provide a base station device. As shown in FIG. 2, the base station device particularly includes:

a first computation module 11, configured to compute a second SINR of a PUSCH signal according to a first SINR obtained by measuring an SRS signal at time $k_0$;

a determination module 12, configured to determine a first MCS index according to the second SINR; and a second computation module 13, configured to compute an amount of PRBs actually to be scheduled and a second MCS index actually to be used according to the first MCS index and a data volume actually required to be transmitted by a UE.

The first computation module 11 is particularly configured to compute the second SINR of the PUSCH signal according to the first SINR and power difference between a single RE of the SRS signal and a single RE of the PUSCH signal.

The first computation module 11 is further configured to compute the second SINR of the PUSCH signal using the following formula:

$$SINR'_{in}(k_0) = SINR_{in}(k_0) \cdot 10^{(P_{PUSCH\_RE\_max} - P_{SRS\_RE})/10};$$

where, $SINR'_{in}(k_0)$ is the second SINR of the PUSCH signal, $SINR_{in}(k_0)$ is the first SINR, and $P_{PUSCH\_RE\_max} - P_{SRS\_RE}$ is the power difference between a single RE of the SRS signal and a single RE of the PUSCH signal.

The first computation module 11 is also configured to compute the power difference between a single RE of the SRS signal and a single RE of the PUSCH signal according to a power headroom reporting (PHR) parameter and a SRS parameter, and compute difference between power of a single RE when a terminal device transmits the PUSCH with the transmission power of a single PRB being expected power and power of a signal RE when the terminal device transmits the PUSCH with a preset amount of PRBs.

The first computation module 11 is further configured to compute $P_{PUSCH\_RE\_max} - P_{SRS\_RE} = -(P_{SRS\_OFFSET} + 3)$ and $P_{PUSCH\_RE\_max\_noLimt} - P_{PUSCH\_RE\_max} = 0$ if the total transmission power of the SRS signal fails to reach a maximum value, and the total transmission power of the PUSCH with the preset amount of PRBs fails to reach the maximum value; or, to compute $P_{PUSCH\_RE\_max} - P_{SRS\_RE} = 10 \log_{10}(M_{SRS}) - 10 \log_{10}(PRB\_MAX) - 3$ and $P_{PUSCH\_RE\_max\_noLimt} - P_{PUSCH\_RE\_max} = 10 \log_{10}(PRB\_MAX) - 10 \log_{10}(M_{PUSCH}(i)) - PH(i)$ if the total transmission power of the SRS signal reaches the maximum value, and the total transmission power of the PUSCH with the preset amount of PRBs reaches the maximum value; or, to compute $P_{PUSCH\_RE\_max} - P_{SRS\_RE} = PH(i) + 10 \log_{10}(M_{PUSCH}) - 10 \log_{10}(PRB\_MAX) - (P_{SRS\_OFFSET} + 3)$ and $P_{PUSCH\_RE\_max\_noLimt} - P_{PUSCH\_RE\_max} = 10 \log_{10}(PRB\_MAX) - 10 \log_{10}(M_{PUSCH}(i)) - PH(i)$ if the total transmission power of the SRS signal fails to reach a maximum value, and the total transmission power of the PUSCH with the preset amount of PRBs reaches the maximum value; or, to compute $P_{PUSCH\_RE\_max} - P_{SRS\_RE} = 10 \log_{10}(M_{SRS}) - 10 \log_{10}(M_{PUSCH}(i)) - PH(i) - 3$ and $P_{PUSCH\_RE\_max\_noLimt} - P_{PUSCH\_RE\_max} = 0$ and if the total transmission power of the SRS signal reaches a maximum value, and the total transmission power of the PUSCH with the preset amount of PRBs fails to reach the maximum value;

where, $P_{PUSCH\_RE\_max} - P_{SRS\_RE}$ is the power difference between a single RE of the SRS signal and a single RE of the PUSCH signal; $P_{PUSCH\_RE\_max\_noLimt} - P_{SRS\_RE\_max}$ is the difference between the power of a single RE when the terminal device transmits the PUSCH with the transmission power of a single PRB being the expected power and the power of a signal RE when the terminal device transmits the PUSCH with the preset amount of PRBs; $P_{SRS\_OFFSET}$ is the power offset of the SRS signal; $M_{SRS}$ is the bandwidth of the SRS signal; PRB_MAX is the preset amount; $M_{PUSCH}(i)$ is the amount of PRBs at time i of the PUSCH, which carries the PHR of the terminal device; and PH(i) is the PHR reported by the terminal device at time i.

The second computation module 13 is particularly configured to compute the actually amount of PRBs to be scheduled and the second MCS index actually to be used according to the following operations: operation A, computing a maximum supportable TBS according to MCS_init_noLimt($k_0$) and PRB_MAX_noLimt; computing the second MCS index $MCS_{index}$ to be MCS_init_noLimt($k_0$), obtaining the amount of PRBs actually required in scheduling through computation according to the second MCS index, and ending the process, if the data volume actually required to be transmitted by the UE is smaller than or equal to the maximum TBS; or executing operation B if the actual data volume required to be transmitted by the UE is greater than the maximum TBS;

operation B, obtaining MCS_actual_b and computing MCS_actual_a=MCS_actual_b+Δ; executing operation C if (MCS_actual_a−MCS_actual_b)≤MCS_diff; otherwise, computing MCS_actual_b=MCS_actual_a and repeating operation B; the initial value of MCS_actual_b is MCS_init_sche_max, and Δ=10·$\log_{10}$(PRB_MAX/PRB_NUM)−10·$\log_{10}$(PRB_MAX/PRB_MAX_scheduled); and operation C, computing the second MCS index $MCS_{index}$=MCS_actual_a, obtaining the amount of PRBs actually required in scheduling according to the second MCS index, and ending the process;

where, MCS_init_noLimt($k_0$) is the first MCS index when a single PRB is transmitted at expected power level at time $k_0$; PRB_MAX_noLimt is the amount of PRBs to be scheduled when the transmission power of the terminal device reaches the maximum value and a single PRB is transmitted at the expected power; MCS_diff is the MCS difference threshold to terminate an iterative calculation; MCS_init_sche_max is the MCS index supportable when the maximum amount of PRBs to be scheduled is PRB_MAX_scheduled; PRB_MAX_scheduled is the maximum schedulable amount of PRBs computed according to a certain MCS index restriction; PRB_MAX is the preset amount of PRBs; PRB_NUM is the amount of PRBs required for transmitting the UE data, computed according to MCS_actual_b.

The second computation module 13 is also configured to compute PRB_MAX_scheduled and MCS_init_sche_max according to the first MCS index $MCS_{init}$ and a pre-configured minimum MCS index target_MCS.

The second computation module 13 is further configured to compute the maximum amount of PRBs allowed to be scheduled, $$PRB\_tmp = \frac{PRB\_MAX}{10^{\wedge}\left(\frac{target_{MCS} - MCS_{init}(k_0)}{10}\right)};$$

if $MCS_{init}$<target_MCS; to compute PRB_MAX_scheduled=PRB_tmp and MCS_init_sche_max=target_MCS if PRB_tmp≥PRB_MAC_noLimt; and to compute PRB_MAX_scheduled=PRB_MAX_noLimt, MCS_init_noLimt($k_0$)=MCS_init($k_0$)+$P_{PUSCH\_RE\_max\_noLimt}$−$P_{PUSCH\_RE\_max}$, and MCS_init_sche_max=MCS_init_noLimt($k_0$), if PRB_tmp<PRB_MAX_noLimit; or, to compute PRB_MAX_scheduled=PRB_MAX, and MCS_init_sche_max=MCS_init($k_0$) if $MCS_{init}$≥target_MCS; where, MCS_init($k_0$) is the first MCS index at time $k_0$, and $P_{PUSCH\_RE\_max\_noLimt}$−$P_{PUSCH\_RE\_max}$ is the difference between the power of a single RE when the terminal device transmits the PUSCH with the transmission power of a single PRB being the expected power and the power of a signal RE when the terminal device transmits the PUSCH with the preset amount of PRBs.

Modules of the device according to embodiments of the disclosure can be integrated or separated. The modules can be integrated into one module, or be further divided into a plurality of submodules.

From the description of the modes for carrying out embodiments, those skilled in the art can clearly understand that the disclosure can be realized by dint of software plus necessary commonly used hardware platform; of course, the disclosure can also be realized by dint of hardware, but under most circumstances, the former is a better mode. Based on such understandings, the essence of the technical scheme of the disclosure or the part having made contributions to the prior art can be embodied in the form of a software product. The computer software product is stored in a storage medium and comprises a plurality of instructions which can enable a piece of computer device (a personal computer, a server, or a piece of network device, and the like) to execute the method set forth in each embodiment of the disclosure. Those skilled in the art can understand that the figure is only a schematic diagram of a preferred embodiment; the modules or process in the figure are not necessarily required in carrying out the disclosure. Those skilled in the art can understand that the modules of the device in the embodiment can be allocated in the device set forth in the embodiment as described in the embodiment, or can be changed accordingly and situated in one or more devices different from the device in the embodiment. The modules set forth in the embodiment can be integrated into one module, or further divided into a plurality of submodules. Serial number of embodiments of the disclosure is added only for the purpose of description and does not show the superiority of embodiments. What have been disclosed in the disclosure are only a plurality of specific embodiments, but the disclosure is not thus restricted thereby. All changes which can be thought out by those skilled in the art shall belong to the reach of protection of the disclosure.

The algorithm and display provided herein are not inherently correlated with any specific computers, virtual systems or other devices. Various general purpose systems can also be used together with the demonstrations based on the disclosure. According to the descriptions presented, the structure required for building such a system is apparent Besides, no specific programming language is provided for the disclosure. What needs to be understood is that various programming languages can be used to realize the contents of the disclosure described herein, and the descriptions of the specific language are only set to disclose the best mode for carrying out the disclosure.

The specification provided herein describes a great deal of concrete details. However, what should be understood is that embodiments of the disclosure can be carried out without these concrete details. Some cases do not display in detail the commonly known methods, structures and technologies, so as not to blur the understanding of the specification.

Similarly, what should be understood is that in order to simplify the disclosure and help to understand one or more aspects of the disclosure, in the descriptions of embodiments of the disclosure, characteristics of the disclosure have sometimes been grouped to a single embodiment and figure, or the descriptions thereof. However, the method for disclosure shall not be interpreted to reflect the following intention: namely, to protect more characteristics than the characteristics recorded clearly in each claim of the disclosure. More precisely, as reflected by the under-mentioned Patent Claims, the aspects of the disclosure are less than all characteristics of each single embodiment disclosed. Therefore, the Patent Claims following the mode for carrying out the disclosure are clearly integrated to the mode for carrying out the disclosure, and each claim is considered as an independent embodiment of the disclosure.

Those skilled in the art can understand that modules of the device in the embodiment can be changed adaptively and set in one or more device different from the embodiment. Modules or units or components set forth in the embodiment can be integrated into one module or unit or component, or can be divided into a plurality of submodules or subunits or subcomponents. Other than such characteristics and/or flows or at least some of the units which are mutually repellent, any combination can be adopted to combine all characteristics disclosed in the specification (including accompanying claims, summary, and figures) as well as any method or all flows or units of the device disclosed accordingly. Unless otherwise clearly stated, each characteristic disclosed in the specification (including the accompanying claims, summary and figures) can be replaced by a substitute characteristic with the same, equivalent or similar aim.

Besides, those skilled in the art can understand that although some embodiments mentioned herein comprise some characteristics included in other embodiments instead of other characteristics, combination of the characteristics of different embodiments means that embodiments are within the scope of the disclosure and form different embodiments. For example, in the under-mentioned Patent Claims, any one of embodiments required to be protected can be used in any combination.

Embodiments of each part of the disclosure can be realized by dint of hardware, or by dint of a software module operating on one or more processors, or by dint of the combination of such hardware and software module. Those skilled in the art shall understand that some or all functions of some or all parts of the device scheduled according to the uplink frequency-selective channel in the embodiments of the disclosure can be realized using a microprocessing unit or a digital signal processor (DSP) in practice. The disclosure can also execute some or all device or device programs (such as a computer program and computer program product) used to perform the method described herein. Such program used to carry out the disclosure can be stored in computer-readable mediums, or be provided with one or a plurality of signals. Such signals can be obtained through downloading from an internet website, or be provided by a carrier signal, or be provided in any other forms.

Figure 3:
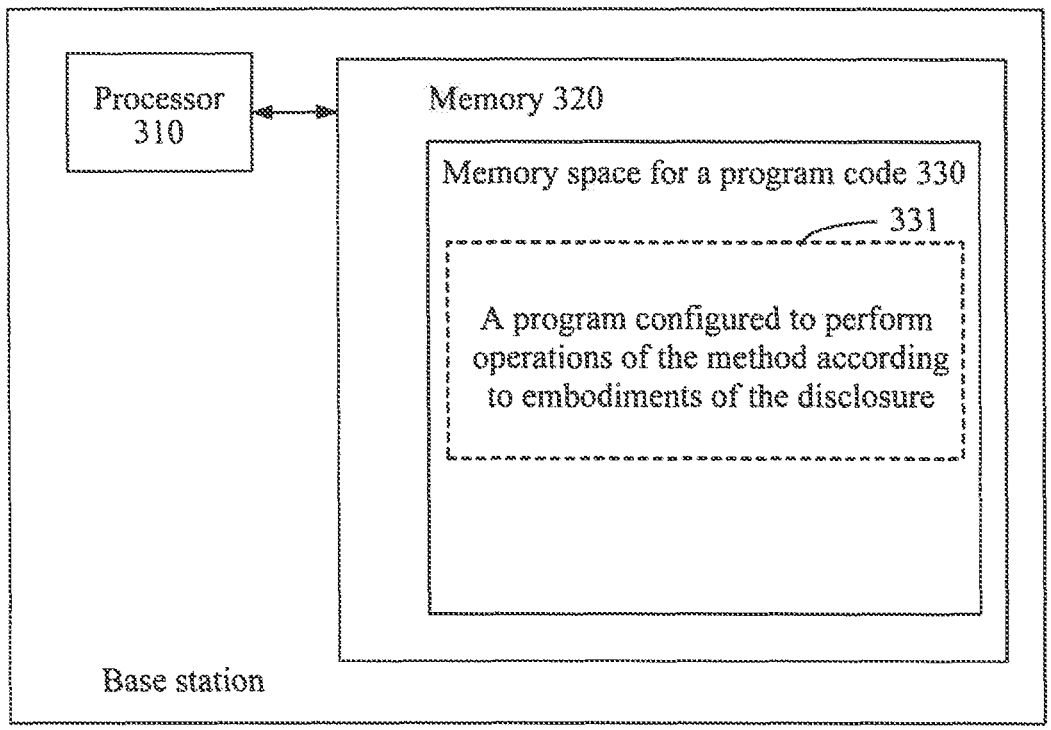
FIG. 3 is a structural block diagram of a base station configured to perform an MCS index determination method according to an embodiment of the disclosure.
Figure 4:
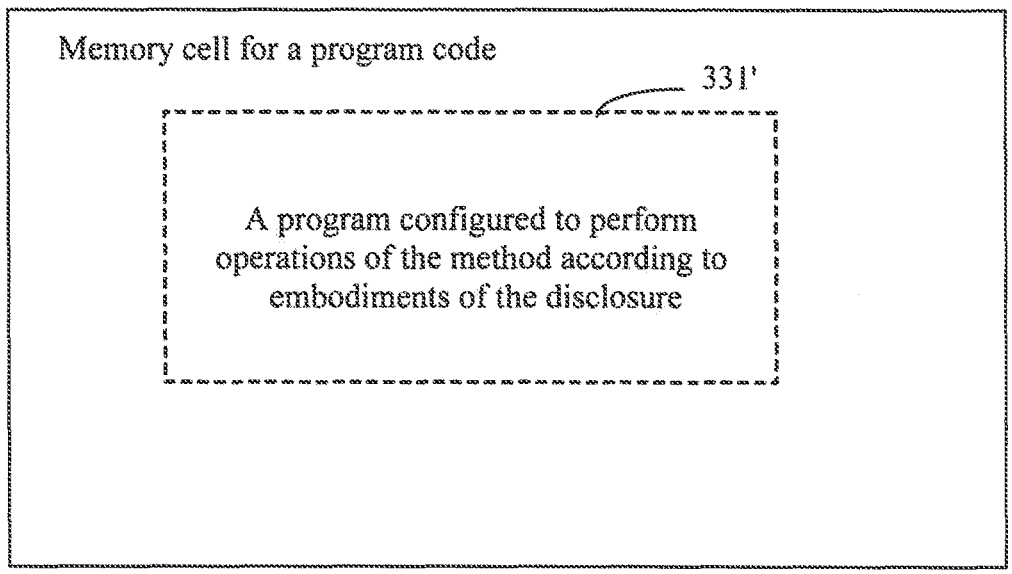
FIG. 4 is a memory cell configured to maintain or carry program codes which realize an MCS index determination method according to an embodiment of the disclosure.

For example, FIG. 3 shows the structural block diagram of a base station configured to perform the determination method of MCS index according to embodiments of the disclosure. Traditionally, the base station includes a processor 310 and a computer program product or a computer-readable medium in the form of a memory 320. The memory 320 can be an electronic memory like a flash memory, an Electrically Erasable Programmable Read-Only Memory (EEPROM), an Erasable Programmable Read-Only Memory (EPROM), a hard disk or a Read-Only Memory (ROM). The memory 320 is provided with a memory space 330 for a program code 331 configured to perform any operation of the abovementioned method. For example, the memory space 330 used for the program code can include program codes 331 respectively used for carrying out each operation of the abovementioned method. These program codes can be read out from or be written into one or a plurality of computer program products. These computer program products include program code carriers such as a hard disk, a compact disc (CD), a memory card or a soft disk. Such a computer program product usually could be a portable or fixed memory cell as illustrated by FIG. 4. The memory cell can be provided with a storage section or memory space similar to the memory 320 in the base station in FIG. 3. The program codes can be compressed, e.g., in an appropriate form. Generally, the memory cell Includes a computer-readable code 331', namely, a code which can be read by a processor such as processor 310. When the code is executed by a base station, the base station will perform each operation of the mentioned method.

"One embodiment", "embodiment" or "one or a plurality of embodiments" mentioned herein means that the specific characteristic(s), structure(s) or feature(s) described according to embodiments of the disclosure is included in at least one embodiment of the disclosure. Besides, one thing need to be noted is that "in one embodiment" may not necessarily refer to the same embodiment.

A detailed introduction is given to an MCS index determination method and base station device provided in embodiments of the disclosure hereinbefore. Specific cases are adopted to describe the principle and mode for carrying out the embodiments of the disclosure. Descriptions of the embodiment only help to understand the method and core thought of the embodiments of the disclosure; In the meanwhile, for those skilled in the art, according to the thought of the embodiments of the disclosure, changes may happen to the mode for carrying out the disclosure and scope of application. In conclusion, contents of the disclosure shall not be understood as restriction of the embodiments of the disclosure.

What is claimed is:

1. An Modulation and Coding Style (MCS) index determination method, comprising:
computing, by a base station device, a second Signal to Interference plus Noise Ratio (SINR) of a Physical Uplink Shared Channel (PUSCH) signal according to a first SINR obtained by measuring an Sounding Reference Signal (SRS) signal at time $k_0$;
determining, by the base station device, a first MCS index according to the second SINR of the PUSCH signal; and
computing, by the base station device, an amount of PRBs to be scheduled and a second MCS index to be used according to the first MCS index and a data volume to be transmitted by a user equipment (UE), and scheduling the UE to transmit data using the amount of PRBs and the second MCS index;
wherein computing, by the base station device, the second SINR of the PUSCH signal according to the first SINR obtained by measuring an SRS signal at time $k_0$, comprises:
computing, by the base station device, the second SINR of the PUSCH signal according to the first SINR and power difference between a single Resource Element (RE) of the SRS signal and a single RE of the PUSCH signal.

2. The method according to claim 1, wherein computing, by the base station device, the second SINR of the PUSCH signal according to the first SINR and power difference between a single RE of the SRS signal and a single RE of the PUSCH signal, comprises:
computing, by the base station device, the second SINR of the PUSCH signal according to the following formula:

$$SINR'_{in}(k_0) = SINR_{in}(k_0) \cdot 10^{(P_{PUSCH\_RE\_max} - P_{SRS\_RE})/10};$$

wherein $SINR'_{in}(k_0)$ is the second SINR of the PUSCH signal, $SINR_{in}(k_0)$ is the first SINR, and $P_{PUSCH\_RE\_max}-P_{SRS\_RE}$ is the power difference between a single RE of the SRS signal and a single RE of the PUSCH signal.

3. The method according to claim 1, wherein the method further comprises:

computing, by the base station device, the power difference between a single RE of the SRS signal and a single RE of the PUSCH signal according to a Power Headroom Report (PHR) parameter and an SRS parameter, and computing difference between power of a single RE when a terminal device transmits the PUSCH with the transmission power of a single PRB being expected power and power of a signal RE when the terminal device transmits the PUSCH with a preset amount of PRBs.

4. The method according to claim 3, wherein computing, by the base station device, the power difference between a single RE of the SRS signal and a single RE of the PUSCH signal according to a PHR parameter and an SRS parameter, and computing difference between power of a single RE when a terminal device transmits the PUSCH with the transmission power of a single PRB being the expected power and power of a signal RE when the terminal device transmits the PUSCH with a preset amount of PRB, comprises:

computing $P_{PUSCH\_RE\_max}-P_{SRS\_RE}=-(P_{SRS\_OFFSET}+3)$ and $P_{PUSCH\_RE\_max\_noLimt}-P_{PUSCH\_RE\_max}=0$, by the base station device, if total transmission power of the SRS signal fails to reach a maximum value, and total transmission power of the PUSCH with a preset amount of PRBs fails to reach the maximum value; or, computing $P_{PUSCH\_RE\_max}-P_{SRS\_RE}=10\ \log_{10}(M_{SRS})-10\ \log_{10}\ (PRB\_MAX)-3$ and $P_{PUSCH\_RE\_max\_noLimt}-P_{PUSCH\_RE\_max}=10\ \log_{10}\ (PRB\_MAX)-10\ \log_{10}(M_{PUSCH}(i))-PH(i)$, by the base station device, if the total transmission power of the SRS signal reaches the maximum value, and the total transmission power of the PUSCH with the preset amount of PRBs reaches the maximum value; or, computing $P_{PUSCH\_RE\_max}-P_{SRS\_RE}=PH(i)+10\ \log_{10}((M_{PUSCH})-10\ \log_{10}\ (PRB\_MAX)-(P_{SRS\_offset}+3)$ and $P_{PUSCH\_RE\_max\_noLimt}-P_{PUSCH\_RE\_max}=10\ \log_{10}\ (PRB\_MAX)-10\log_{10}(M_{PUSCH}(i))-PH(i)$, by the base station device, if the total transmission power of the SRS signal fails to reach the maximum value, and the total transmission power of the PUSCH with the preset amount of PRBs reaches the maximum value; or, computing $P_{PUSCH\_RE\_max}-P_{SRS\_RE}=10\ \log_{10}(M_{SRS})-10\ \log_{10}(M_{PUSCH}(i)-PH(i)-3$ and $P_{PUSCH\_RE\_max\_noLimt}-P_{PUSCH\_RE\_max}=0$, by the base station device, if the total transmission power of the SRS signal reaches the maximum value, and the total transmission power of PUSCH with the preset amount of PRBs fails to reach the maximum value;

wherein $P_{PUSCH\_RE\_max}-P_{SRS\_RE}$ is the power difference between a single RE of the SRS signal and a single RE of the PUSCH signal; $P_{PUSCH\_RE\_max\_noLimt}-P_{PUSCH\_RE\_max}$ is the difference between the power of a single RE when the terminal device transmits the PUSCH with the transmission power of a single PRB being the expected power and the power of a signal RE when the terminal device transmits the PUSCH with the preset amount of PRBs; $P_{SRS\_OFFSET}$ is the power offset of the SRS signal; $M_{SRS}$ is the bandwidth of the SRS signal; PRB_MAX is the preset amount; $M_{PUSCH}(i)$ is the amount of PRBs at time i of the PUSCH, which carries the PHR of the terminal device; PH(i) is the PHR reported by the terminal device at time i.

5. The method according to claim 1, wherein computing, by the base station device, an amount of PRBs to be scheduled and a second MCS index to be used according to the first MCS index and a data volume to be transmitted by a UE, comprises:

operation A, computing, by the base station device, a maximum supportable Transport Block Size (TBS) according to $MCS\_init\_noLimt(k_0)$ and PRB_MAX_noLimt; if the data volume to be transmitted by the UE is smaller than or equal to the maximum TBS, computing the second MCS index $MCS_{index}$ to be $MCS\_init\_noLimt(k_0)$, obtaining the amount of PRBs required in scheduling through computation according to the second MCS index, and ending the process, or, if the data volume to be transmitted by the UE is greater than the maximum TBS, executing operation B;

operation B, obtaining, by the base station device, MCS_actual_b and computing MCS_actual_a=MCS_actual_b+Δ by the base station device; if $(MCS_{actual_a}-MCS_{actual_b})\leq MCS_{diff}$, executing operation C, otherwise, computing MCS_actual_b=MCS_actual_a and repeating operation B; wherein the initial value of MCS_actual_b is MCS_init_sche_max, and $\Delta=10\cdot\log_{10}\ (PRB\_MAX/PRB\_NUM)-10\cdot\log_{10}(PRB\_MAX/PRB\_MAX\_scheduled)$; and operation C, computing, by the base station device, the second MCS index $MCS_{index}$=MCS_actual_a, obtaining the amount of PRBs required in scheduling according to the second MCS index, and ending the process;

wherein $MCS\_init\_noLimt(k_0)$ is the first MCS index when a single PRB is transmitted at the expected power at time $k_0$; PRB_MAX_noLimt is the amount of PRBs to be scheduled when the transmission power of the terminal device reaches the maximum value and a single PRB is transmitted at the expected power; MCS_diff is an MCS difference threshold to terminate an iterative calculation; MCS_init_sche_max is an MCS index supportable when the maximum amount of PRBs to be scheduled is PRB_MAX_scheduled; PRB_MAX_scheduled is the maximum schedulable amount of PRBs computed according to an MCS index restriction;

PRB_MAX is the preset amount of PRBs; PRB_NUM is the amount of PRBs required for transmitting the UE data, computed according to MCS_actual_b.

6. The method according to claim 5, wherein the method further comprises:

computing, by the base station device, PRB_MAX_scheduled and MCS index and the MCS index MCS_init_sche_max, according to the first MCS index $MCS_{init}$ and a pre-configured minimum MCS index target_MCS.

7. The method according to claim 5, wherein computing, by the base station device, PRB_MAX_scheduled and the MCS index MCS_init_sche_max, by the base station according to the first MCS index $MCS_{init}$ and a pre-configured minimum MCS index target_MCS, comprises:

if $MCS_{init}$<target_MCS, computing, by the base station device, the maximum amount of PRBs allowed to be scheduled, $$PRB\_tmp = \frac{PRB\_MAX}{10\wedge\left(\frac{target_{MCS} - MCS_{init}(k_0)}{10}\right)};$$

if PRB_tmp≥PRB_MAX_noLimt, computing, by the base station device, PRB_MAX_scheduled=PRB_tmp and MCS_init_sche_max=target_MCS, and if PRB_tmp<PRB_MAX_noLimit, computing, by the base station device, PRB_MAX_scheduled=PRB_MAX_noLimit, MCS_init_noLimt($k_0$)=MCS_init($k_0$)+$P_{PUSCH\_RE\_max\_noLimt}$–$P_{PUSCH\_RE\_max}$, and MCS_init_sche_max=MCS_init_noLimt($k_0$); or, if MCS$_{init}$≥target_MCS, computing, by the base station device, PRB_MAX_scheduled=PRB_MAX, and MCS_init_sche_max=MCS_init($k_0$); wherein MCS_init($k_0$) is the first MCS index at time $k_0$, and $P_{PUSCH\_RE\_max\_noLimt}$–$P_{PUSCH\_RE\_max}$ is the difference between the power of a single RE when the terminal device transmits the PUSCH with the transmission power of a single PRB being the expected power and the power of a signal RE when the terminal device transmits the PUSCH with the preset amount of PRBs.

8. A base station device, comprising:
a processor; and
a memory storing at least one instruction, wherein the processor is configured to execute the at least one instruction to:
compute a second SINR of a PUSCH signal according to a first SINR obtained by measuring an SRS signal at time $k_0$;
determine a first MCS index according to the second SINR of the PUSCH signal; and
compute an amount of PRBs to be scheduled and a second MCS index to be used according to the first MCS index and a data volume to be transmitted by a UE, and schedule the UE to transmit data using the amount of PRBs and the second MCS index;
wherein the processor is also configured to execute the at least one instruction to:
compute the second SINR of the PUSCH signal according to the first SINR and power difference between a single RE of the SRS signal and a single RE of the PUSCH signal.

9. The base station device according to claim 8, wherein the processor is configured to execute the at least one instruction to:
compute the second SINR of the PUSCH signal according to the following formula:

$$SINR'_{in}(k_0) = SINR_{in}(k_0) \cdot 10^{(P_{PUSCH\_RE\_max}-P_{SRS\_RE})/10};$$

wherein SINR'$_{in}$($k_0$) is the second SINR of the PUSCH signal, SINR$_{in}$($k_0$) is the first SINR, and $P_{PUSCH\_RE\_max}$–$P_{SRS\_RE}$ is the power difference between a single RE of the SRS signal and a single RE of the PUSCH signal.

10. The base station device according to claim 8, wherein the processor is configured to execute the at least one instruction to:
compute the power difference between a single RE of the SRS signal and a single RE of the PUSCH signal according to a PHR parameter and an SRS parameter, and compute difference between power of a single RE when a terminal device transmits the PUSCH with the transmission power of a single PRB being expected power and power of a signal RE when the terminal device transmits the PUSCH with a preset amount of PRB.

11. The base station device according to claim 10, wherein, the processor is configured to execute the at least one instruction to:
compute $P_{PUSCH\_RE\_max}$–$P_{SRS\_RE}$=($P_{SRS\_OFFSET}$+3) and $P_{PUSCH\_RE\_max\_noLimt}$–$P_{PUSCH\_RE\_max}$=0, by the base station device, if total transmission power of the SRS signal fails to reach a maximum value, and total transmission power of the PUSCH with a preset amount of PRBs fails to reach the maximum value; or,
compute $P_{PUSCH\_RE\_max}$–$P_{SRS\_RE}$=10 log$_{10}$(M$_{SRS}$)–10 log$_{10}$ (PRB_MAX)–3 and $P_{PUSCH\_RE\_max\_noLimt}$–$P_{PUSCH\_RE\_max}$=10 log (PRB_MAX)–10 log$_{10}$ (M$_{PUSCH}$(i))–PH(i), by the base station device, if the total transmission power of the SRS signal reaches the maximum value, and the total transmission power of the PUSCH with the preset amount of PRBs reaches the maximum value; or,
compute $P_{PUSCH\_RE\_max}$–$P_{SRS\_RE}$=PH(i)+10 log$_{10}$ (M$_{PUSCH}$)–10 log$_{10}$ (PRB_MAX)–($P_{SRS\_OFFSET}$+3) and $P_{PUSCH\_RE\_max\_noLimt}$–$P_{PUSCH\_RE\_max}$=10 log$_{10}$ (PRB_MAX)–10 log$_{10}$(M$_{PUSCH}$(i))–PH(i), by the base station device, if the total transmission power of the SRS signal fails to reach the maximum value, and the total transmission power of the PUSCH with the preset amount of PRBs reaches the maximum value; or,
compute $P_{PUSCH\_RE\_max}$–$P_{SRS\_RE}$=10 log$_{10}$(M$_{SRS}$)–10 log$_{10}$(M$_{PUSCH}$(i))–PH(i)–3 and $P_{PUSCH\_RE\_max\_noLimt}$–$P_{PUSCH\_RE\_max}$=0, by the base station device, if the total transmission power of the SRS signal reaches the maximum value, and the total transmission power of PUSCH with the preset amount of PRBs fails to reach the maximum value;
wherein $P_{PUSCH\_RE\_max}$–$P_{SRS-RE}$ is the power difference between a single RE of the SRS signal and a single RE of the PUSCH signal; $P_{PUSCH\_RE\_max\_noLimt}$–$P_{PUSCH\_RE\_max}$ is the difference between the power of a single RE when the terminal device transmits the PUSCH with the transmission power of a single PRB being the expected power and the power of a signal RE when the terminal device transmits the PUSCH with the preset amount of PRBs; $P_{SRS\_OFFSET}$ is the power offset of the SRS signal; M$_{SRS}$ is the bandwidth of the SRS signal; PRB_MAX is the preset amount; M$_{PUSCH}$(i) is the amount of PRBs at time i of the PUSCH, which carries the PHR of the terminal device; PH(i) is the PHR reported by the terminal device at time i.

12. The base station device according to claim 8, wherein the processor is configured to execute the at least one instruction to perform the following operations:
operation A, computing a maximum supportable Transport Block Size (TBS) according to MCS_init_noLimt ($k_0$) and PRB_MAX_noLimt; if the data volume to be transmitted by the UE is smaller than or equal to the maximum TBS, computing the second MCS index MCS$_{index}$ to be MCS_init_noLimt($k_0$), obtaining the amount of PRBs required in scheduling through computation according to the second MCS index, and ending the process, or, if the data volume to be transmitted by the UE is greater than the maximum TBS, executing operation B; operation B, obtaining MCS_actual_b and computing MCS_actual_a=MCS_actual_b+Δ by the base station device; if (MCS$_{actual_a}$–MCS$_{actual_b}$)≤MCS$_{diff}$, executing operation C, otherwise, computing MCS_actual_b=MCS_actual_a and repeating operation B; wherein the initial value of MCS_actual_b is MCS_init_sche_max and Δ=10·log$_{10}$(PRB_MAX/

PRB_NUM)−10·$\log_{10}$(PRB_MAX/PRB_MAX_scheduled); and operation C, computing the second MCS index $MCS_{index}$=MCS_actual_a, obtaining the amount of PRBs required in scheduling according to the second MCS index, and ending the process; wherein MCS_init_noLimt($k_0$) is the first MCS index when a single PRB is transmitted at the expected power at time $k_0$; PRB_MAX_noLimt is the amount of PRBs to be scheduled when the transmission power of the terminal device reaches the maximum value and a single PRB is transmitted at the expected power; MCS_diff is an MCS difference threshold to terminate an iterative calculation; MCS_init_sche_max is an MCS index supportable when the maximum amount of PRBs to be scheduled is PRB_MAX_scheduled; PRB_MAX_scheduled is the maximum schedulable amount of PRBs computed according to an MCS index restriction; PRB_MAX is the preset amount of PRBs; PRB_NUM is the amount of PRBs required for transmitting the UE data, computed according to MCS_actual_b.

13. The base station device according to claim 12, wherein, the processor is configured to execute the at least one instruction to:
compute PRB_MAX_scheduled and MCS index and the MCS index MCS_init_sche_max, according to the first MCS index $MCS_{init}$ and a pre-configured minimum MCS index target_MCS.

14. The base station device according to claim 13, wherein the processor is configured to execute the at least one instruction to:
if $MCS_{init}$<target_MCS, compute the maximum amount of PRBs allowed to be scheduled, $$PRB\_tmp = \frac{PRB\_MAX}{10\wedge\left(\frac{target_{MCS} - MCS_{init}(k_0)}{10}\right)};$$

if PRB_tmp≥PRB_MAX_noLimt, compute PRB_MAX_scheduled=PRB_tmp and MCS_init_sche_max=target_MCS, and if PRB_tmp<PRB_MAX_noLimit, compute PRB_MAX_scheduled=PRB_MAX_noLimit, MCS_init_noLimt($k_0$)=MCS_init($k_0$)+$P_{PUSCH\_RE\_max\_noLimt}$−$P_{PUSCH\_RE\_max}$, and MCS_init_sche_max=MCS_init_noLimt($k_0$); or,
if $MCS_{init}$≥target_MCS, compute PRB_MAX_scheduled=PRB_MAX and MCS_init_sche_max=MCS_init($k_0$); wherein MCS_init($k_0$) is the first MCS index at time $k_0$, and $P_{PUSCH\_RE\_max\_noLimt}$−$P_{PUSCH\_RE\_max}$ is the difference between the power of a single RE when the terminal device transmits the PUSCH with the transmission power of a single PRB being the expected power and the power of a signal RE when the terminal device transmits the PUSCH with the preset amount of PRBs.

15. A non-transitory computer readable storage medium comprising a computer-readable code, wherein when the computer-readable code is executed on a base station, the base station is configured to execute a Modulation and Coding Style (MCS) index determination method comprising:
computing a second Signal to Interference plus Noise Ratio (SINR) of a Physical Uplink Shared Channel (PUSCH) signal according to a first SINR obtained by measuring an Sounding Reference Signal (SRS) signal at time $k_0$;
determining a first MCS index according to the second SINR of the PUSCH signal; and
computing an amount of PRBs to be scheduled and a second MCS index to be used according to the first MCS index and a data volume to be transmitted by a user equipment (UE), and scheduling the UE to transmit data using the amount of PRBs and the second MCS index;
wherein computing the second SINR of the PUSCH signal according to the first SINR, obtained by measuring an SRS signal at time $k_0$, comprises:
computing the second SINR of the PUSCH signal according to the first SINR and power difference between a single Resource Element (RE) of the SRS signal and a single RE of the PUSCH signal.

* * * * *